(12) United States Patent
Côté

(10) Patent No.: US 7,277,591 B1
(45) Date of Patent: Oct. 2, 2007

(54) EDGE SMOOTHING ON RASTER IMAGES

(75) Inventor: Stéphane Côté, Lac Beauport (CA)

(73) Assignee: Bentley Systems, Inc., Exton, PA (US)

( * ) Notice: Subject to any disclaimer, the term of this patent is extended or adjusted under 35 U.S.C. 154(b) by 825 days.

(21) Appl. No.: 10/368,631

(22) Filed: Feb. 20, 2003

(51) Int. Cl.
*G06K 9/40* (2006.01)

(52) U.S. Cl. ............... 382/267; 382/192; 358/3.27

(58) Field of Classification Search ........... 382/266, 382/264, 267–269, 197, 241, 258, 259, 192, 382/275, 271, 270, 257; 345/611; 358/3, 358/27
See application file for complete search history.

(56) References Cited

U.S. PATENT DOCUMENTS

| | | | | |
|---|---|---|---|---|
| 4,630,309 A | * | 12/1986 | Karow | 382/241 |
| 5,325,474 A | * | 6/1994 | Kumazaki et al. | 345/611 |
| 6,052,131 A | * | 4/2000 | Oka | 345/441 |
| 6,111,994 A | * | 8/2000 | Katayama et al. | 382/298 |
| 6,429,877 B1 | * | 8/2002 | Stroyan | 345/611 |

OTHER PUBLICATIONS

M. Sonka, V. Hlavac, and R. Boyle, "Image Processing, Analysis and Machine Vision", 1993, Chapman and Hall Computing, England, pp. 129-130.

* cited by examiner

*Primary Examiner*—Matthew C. Bella
*Assistant Examiner*—Dennis Rosario
(74) *Attorney, Agent, or Firm*—Venable LLP; Jeffri A. Kaminski; Caroline J. Swindell (57) ABSTRACT

A method of edge-smoothing in raster images includes: selecting an object in a raster image, the object including an edge having a plurality of edge pixels; finding all of the edge pixels of the object and generating a polygon having a plurality of vertices, each of which is located at the center of a corresponding one of the edge pixels; smoothing the polygon of the object to generate a smoothed polygon; and smoothing the object according to the smoothed polygon.

23 Claims, 12 Drawing Sheets

EDGE SMOOTHING ON RASTER IMAGES

BACKGROUND OF THE INVENTION

1. Field of the Invention

The present invention relates generally to converting grayscale images to raster images, and more particularly to smoothing images after such conversion.

2. Related Art

Legacy paper engineering drawings are often imported into computer memory so that they can be modified, used as a basis for creating new drawings, or for long-term electronic storage. To do so, the drawings are read on a scanner by a process that transforms the drawings into a digital raster image. Generally, engineering drawings are scanned in two colors, i.e. 1-bit color, usually black and white, because two-color drawings take less storage space and are more easily and more quickly manipulated by imaging software. Sometimes engineering drawings are scanned in 8-bit (grayscale) or in 24-bit (true color), but quite often the images eventually get transformed into 1-bit (two color) images.

The process of scanning images in 1-bit mode or transforming images to 1-bit mode requires the user to choose a threshold that will decide what is black and what is white. For instance, for a drawing scanned in grayscale (8-bit), the gray values of its pixels range from 0 (black) to 255 (white). To transform such an image to 1-bit mode, the user has to choose the gray value that will split those color values between black and white in the new image. That value could be set to 127, which would transform any pixel having a gray value lower than 127 to black, and the others to white. The threshold could also have a lower value such as 10, which would make most pixels except the very dark ones become white.

Because of various factors, such as the non-uniform nature of paper, ink, scanner response, etc., adjacent pixels that look the same may have slightly different gray values. Therefore, in the transformation process from grayscale to black and white, a set of pixels along a line may not all be transformed into the same color when transformed into 1-bit data. This leads to a common problem: the edges of lines on a drawing scanned or transformed into 1-bit mode are often characterized by random pixels that prevent the edges from being smooth and uniform. Pixels missing from an edge are called holes, and pixels added to an edge are called bumps. Those random holes and bumps along the edges are an undesired consequence of the various factors cited above.

Figure 1A:
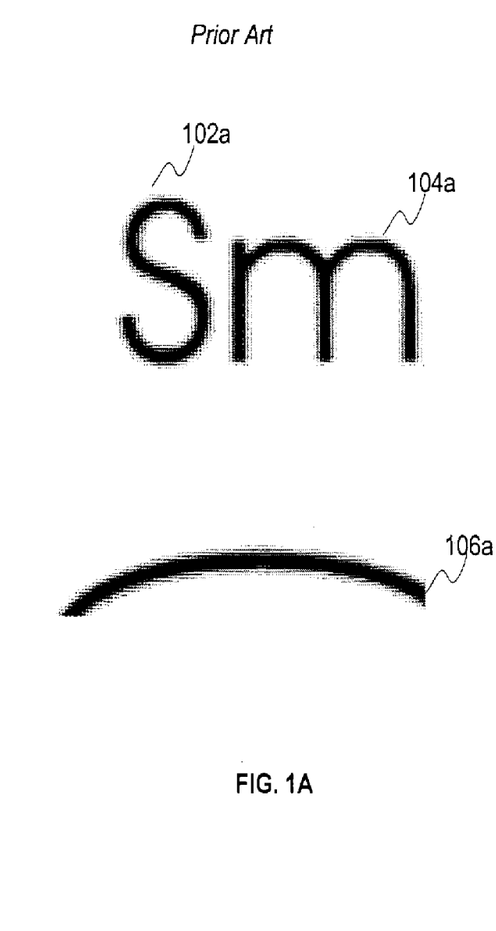
FIG. 1A depicts an exemplary embodiment of a grayscale image prior to 1 bit conversion.
Figure 1B:
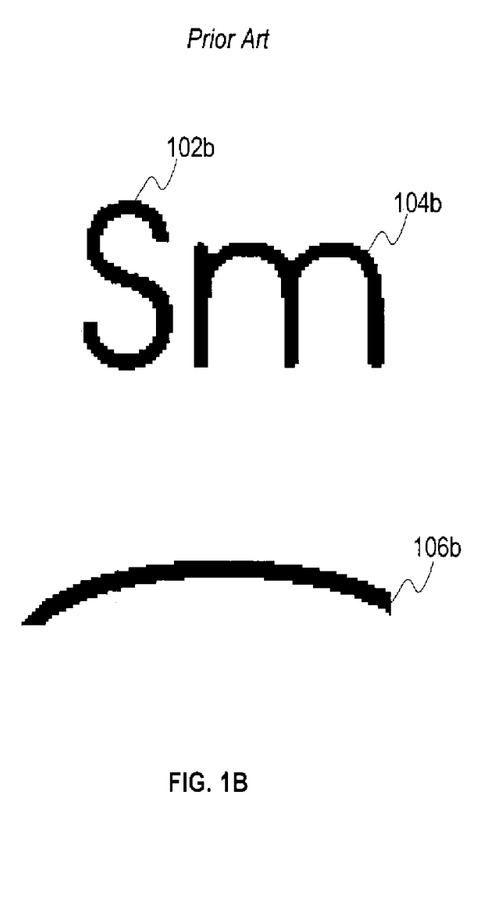
FIG. 1B depicts an exemplary embodiment of the image in FIG. 1A conventionally converted to a 1-bit image.

FIG. 1A shows an exemplary grayscale image prior to conversion. The image consists of a character 102a, a character 104a and a curve 106a. FIG. 1B shows the same image converted to 1-bit color. The smooth characters 102a and 104a from FIG. 1A are now jagged characters 102b and 104b, respectively. Similarly, the smooth curve 106a becomes a jagged, stepped curve 106b in FIG. 1B.

Figure 2A:
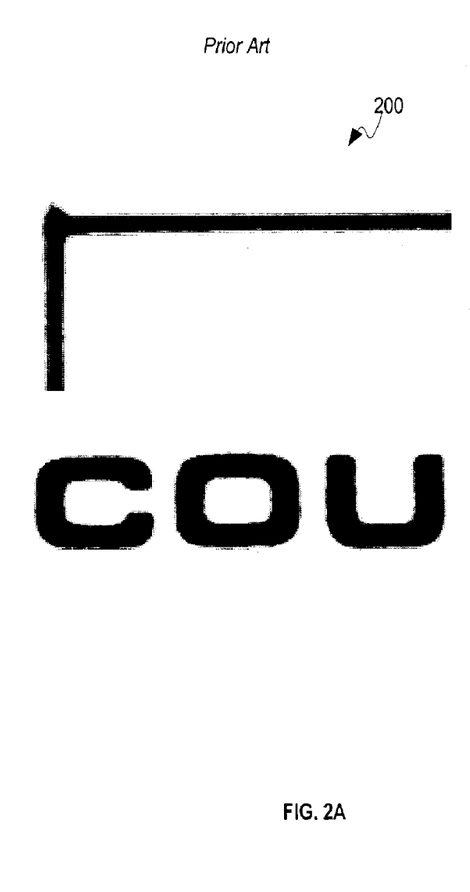
FIG. 2A depicts an exemplary embodiment of a grayscale image prior to 1 bit conversion.
Figure 2B:
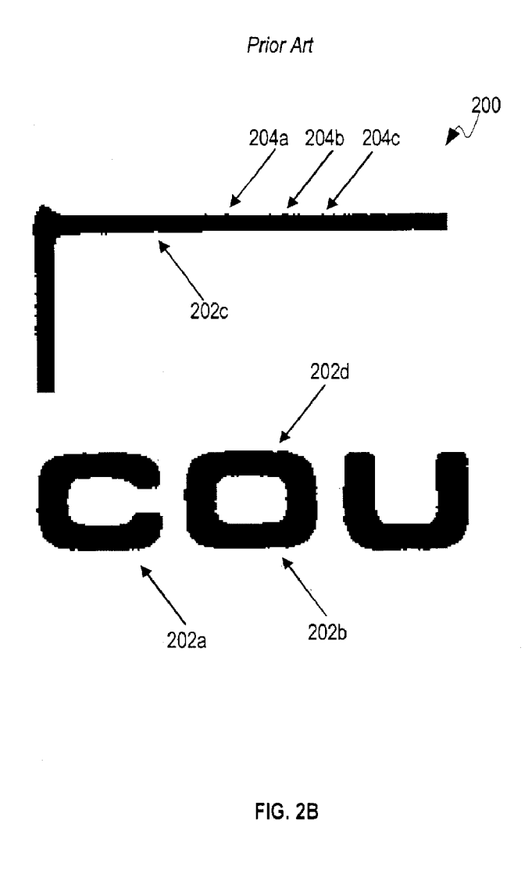
FIG. 2B depicts an exemplary embodiment of the image in FIG. 2A conventionally converted to a 1-bit image.

FIG. 2A shows another exemplary grayscale image 200 prior to conversion to 1-bit color. FIG. 2B shows the same image 200 converted to 1-bit color. Holes in the lines are indicated, for example, by arrows 202a, 202b, 202c and 202d. Bumps are indicated, for example, by arrows 204a, 204b, and 204c.

One approach to solving this problem is used by MicroStation™ IRAS/B available from Bentley Systems Inc. of Exton, Pa. IRAS/B has a tool called "Smooth" for repairing edges that have bumps and holes. However, IRAS/B can only fill or remove "single pixel" holes or bumps, i.e. holes or bumps where only one pixel is missing or added. That is a fairly limiting constraint, as those single pixels represent a minority of the noisy pixels encountered along edges.

Figure 3A:
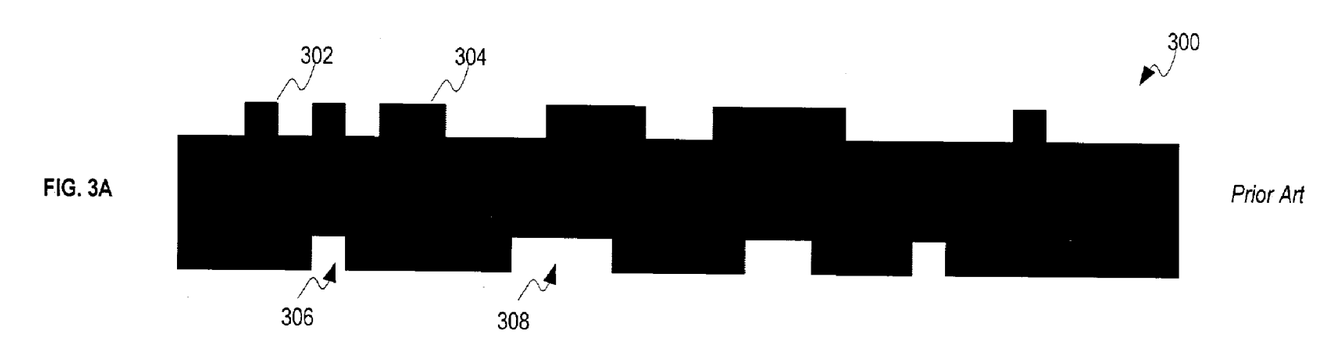
FIG. 3A depicts an exemplary embodiment of a conventionally converted 1-bit image.
Figure 3B:
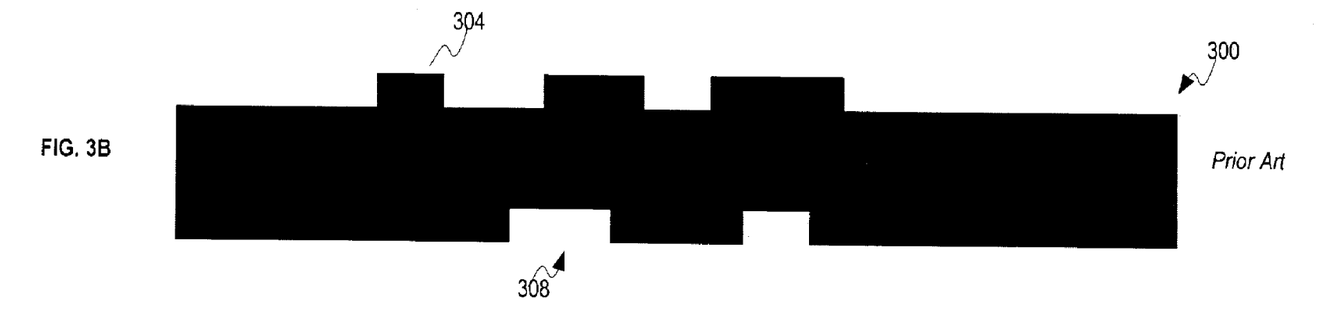
FIG. 3B depicts FIG. 3A smoothed according to conventional methods.

An example of the result obtained using that IRAS/B is given in FIGS. 3A and 3B. FIG. 3A shows an exaggerated view of an edge 300 resulting from conversion to 1-bit color. The edge 300 has single bumps, for example bump 302, and multiple bumps, for example bump 304, which contains more than one pixel. Similarly, edge 300 has single holes, for example hole 306, and multiple holes, for example, hole 308, which is missing more than one pixel.

FIG. 3B shows the edge 300 after the application of the IRAS/B tool. The single bump 302 is removed and single hole 306 is filled, but the multiple bump 304 and multiple hole 308 remain un-smoothed.

What is needed then is an improved way of smoothing 1-bit color images that overcomes shortcomings of conventional solutions.

SUMMARY OF THE INVENTION

In an exemplary embodiment of the present invention a system, method and computer program product for edge smoothing on raster images is disclosed.

In an exemplary embodiment, the present invention can be a method of edge-smoothing in raster images including the steps of: selecting an object in a raster image, the object including an edge having a plurality of edge pixels; finding all of the edge pixels of the object and generating a polygon having a plurality of vertices, each of which is located at the center of a corresponding one of the edge pixels; smoothing the polygon of the object to generate a smoothed polygon; and smoothing the object according to the smoothed polygon.

In another exemplary embodiment, the present invention can be a system for edge-smoothing in raster images comprising: means for selecting an object in a raster image, the object including an edge having a plurality of edge pixels; means for finding all of the edge pixels of the object and generating a polygon having a plurality of vertices, each of which is located at the center of a corresponding one of the edge pixels; means for smoothing the polygon of the object to generate a smoothed polygon; and means for smoothing the object according to the smoothed polygon.

In another exemplary embodiment, the present invention can be a computer useable information storage medium storing computer readable program code for causing a computer to perform the steps of: selecting an object in a raster image, the object including an edge having a plurality of edge pixels; finding all of the edge pixels of the object and generating a polygon having a plurality of vertices, each of which is located at the center of a corresponding one of the edge pixels; smoothing the polygon of the object to generate a smoothed polygon; and smoothing the object according to the smoothed polygon.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DEFINITIONS

As used herein, the following terms shall have the following meanings:

1-bit image colors: 1-bit images have two colors. Typically, and for the purpose of simplifying the discussion, these two colors are black and white. However, in practice, these colors can be any two different colors.

Background/Foreground: the two colors that form a 1-bit image. The foreground color is the one that carries the information in the image, and is often the one that has the lowest number of pixels.

Object: a group of contiguous pixels of the foreground color that form a shape in a 1-bit image.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Figure 4:
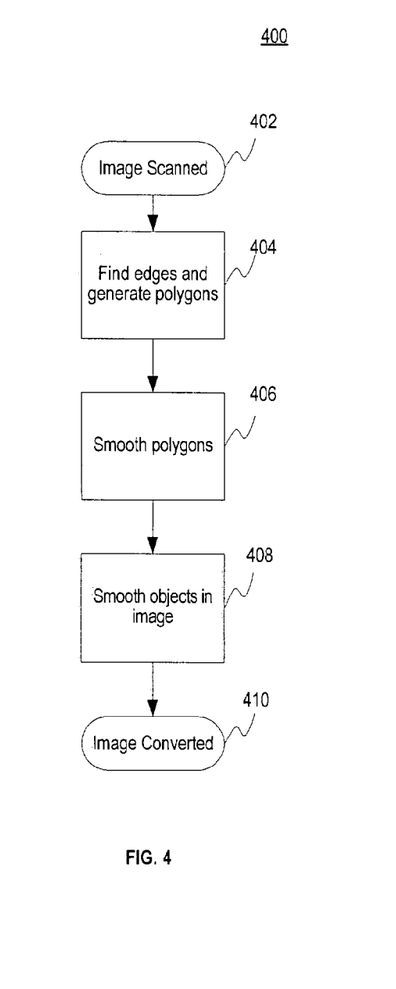
FIG. 4 depicts a flow chart of an exemplary embodiment of the method of the present invention.

In the following, conversion to 1-bit color and smoothing of the 1-bit images is discussed, however, the present invention can also apply to raster images of more than 1-bit color. In an exemplary embodiment, the present invention solves the problem of conversion to 1-bit color in three main steps, as seen in FIG. 4. Once the image is scanned in step 402, the edges of the foreground shapes are found and polygons are generated in step 404. This step consists of locating all pixels that are on the edge between the foreground and background colors, and generating a polygon in each object where the polygon vertices are positioned at the center of edge pixels for each object in the image. Next, the polygons are smoothed in step 406. This step consists of smoothing the horizontal and vertical lines of the edge polygons generated in the first step. Then, the objects are smoothed in step 408 resulting in a converted image 410. This last step 408 consists of filling holes and removing bumps by changing the color of the corresponding pixels in the image based on the smoothed edge polygons obtained in the previous step.

There are several methods known in the art for identifying edges and polygons. One method, called inner boundary tracing is described in: Sonka, Hlavac and Boyle: *Image Processing, Analysis and Machine Vision*, Chapman & Hall Computing, 1993. The present invention can use a variant of this method.

Figure 5:
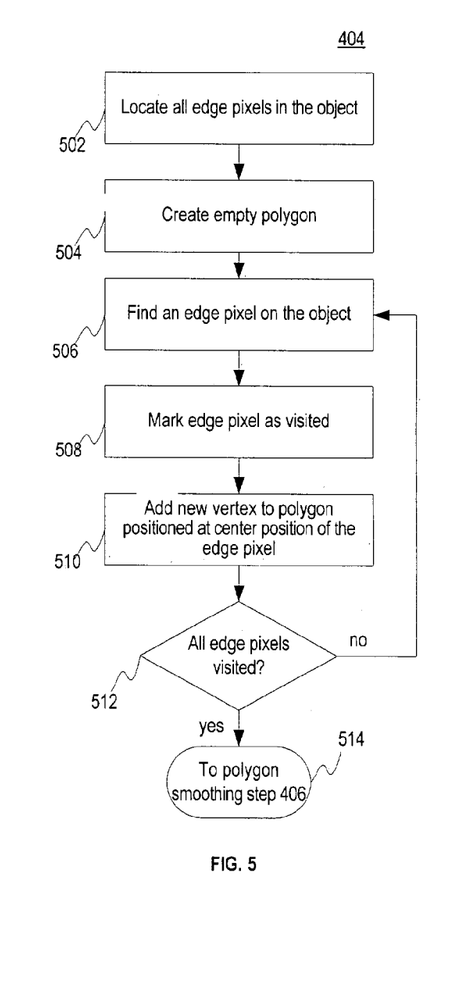
FIG. 5 depicts a flow chart of an exemplary embodiment of the step of finding edges according to the present invention.

The edge finding and polygon generation method of step 404 is depicted in FIG. 5. The edge finding and polygon generation step 404 occurs for each object in the image. First, all edge pixels in an object are located in step 502. Then, for each object in the image, a new empty polygon (i.e. a polygon with no vertices) is created in step 504. An edge pixel on the object is located in step 506, and the edge pixel is marked as visited in step 508. A new vertex positioned at the center of that pixel is then added to the polygon in step 510. If not all of the edge pixels in the object have been visited at step 512, the process repeats from step 506 until all of the edge pixels in the object have been visited. As the process repeats, at step 506, an unvisited pixel adjacent to the previously visited pixel is selected. When all the image objects have been visited, the process then proceeds, in step 514, to the polygon smoothing step 406.

Figure 6A:
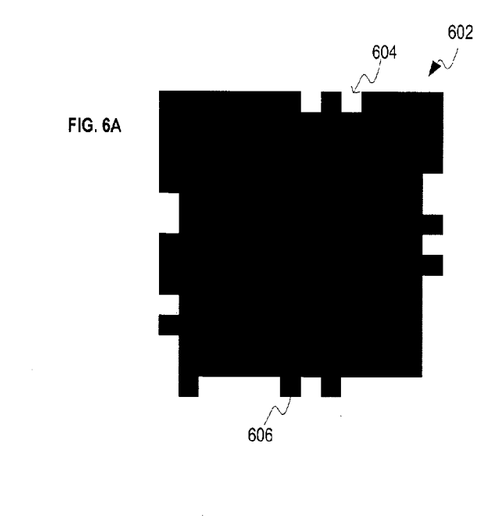
FIGS. 6A-C depict the application of the method illustrated in FIG. 5 according to the present invention.
Figure 6B:
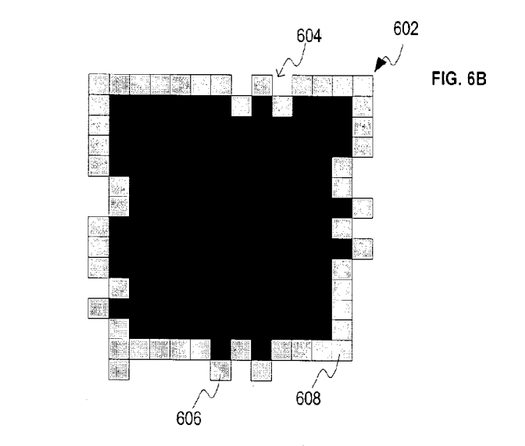
Figure 6C:
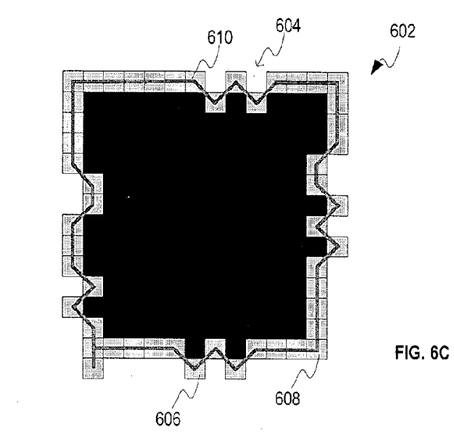

The result, for each object in the image, is a polygon having vertices at the center position of each edge pixel in the image. FIGS. 6A-C show the application of the step 404 to an object 602. FIG. 6A shows an object 602 after conversion to 1-bit color, but before any smoothing. Object 602 has holes, for example, hole 604, and bumps, for example, bump 606. FIG. 6B shows the application of step 502. The gray pixels, for example, pixel 608, indicate the edge pixels of object 602. FIG. 6C shows the final result of the edge finding and polygon generating step 404. A polygon, indicated by line 610, contains a number of vertices, each positioned in the center of an edge pixel.

The next main step of polygon smoothing consists of smoothing the vertical and horizontal lines of the polygon obtained at the previous step. This step involves locating and smoothing all horizontal and vertical lines. Polygon smoothing can take place by identifying a number of vertices that are in a substantially linear arrangement, i.e. vertical or horizontal. Because of the holes and bumps, some vertices will be in one position and other vertices will be in another, despite the substantial linearity of their arrangement. Whichever position contains the most vertices is the majority position, and the position having the fewest vertices is the minority position. The vertices in the minority position are moved to the majority position to smooth the polygon.

Figure 7:
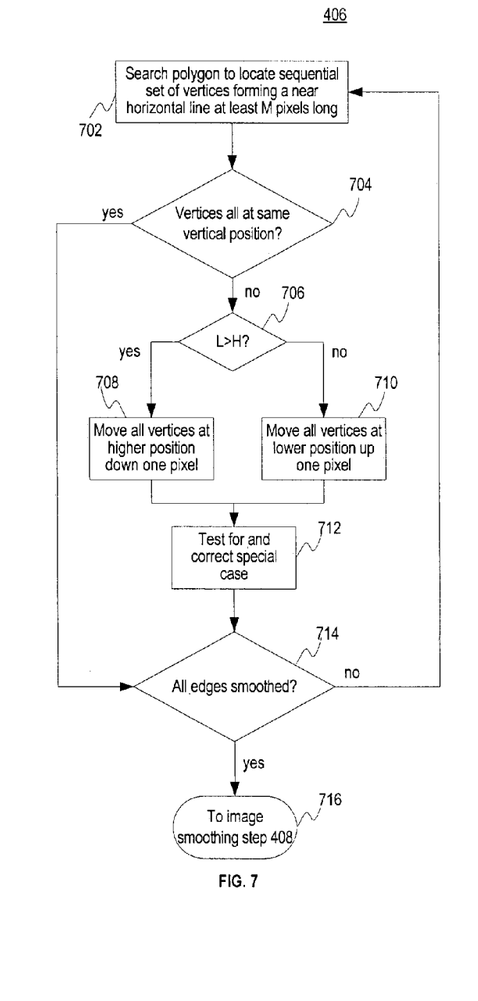
FIG. 7 depicts a flow chart of an exemplary embodiment of the step of smoothing polygons according to the present invention.

FIG. 7 depicts a flow chart of an exemplary embodiment of the polygon smoothing step 406 according to the present invention. The following discussion describes smoothing horizontal lines, however, the method applies analogously to smoothing vertical lines. First, the polygon is searched to find a sequential set of vertices that form a near horizontal line that is at least a number M pixels long in step 702. A near horizontal line is a section of the polygon where the vertices have vertical positions that differ by at most one pixel position value. Next, the pixels in the near horizontal line are checked to see if they are all at the same vertical position in step 704. If so, the pixels already form a smooth line, and nothing is done for that near horizontal line. If not, the number of vertices along the near-horizontal line that are located at the higher vertical position, "H", is compared to the number of vertices along the near-horizontal line that are located at the lower vertical position, "L", in step 706. If L is larger than H, all vertices that are at the higher vertical position are moved down by one pixel in step 708. Otherwise, all vertices that are at the lower vertical position are moved up by one pixel in step 710. After the application of step 708 or 710, a special case is considered and corrected for if it exists in step 712. The special case is discussed in greater detail below in reference to FIGS. 12 and 13. If not all of the edges have been smoothed at step 714, the process repeats for the object from step 702. Once all of the edges on the polygon for that object have been smoothed, the process proceeds in step 716 to the image smoothing step 408. The polygon smoothing step 406 is repeated for all of the objects in the image.

Figure 8A:
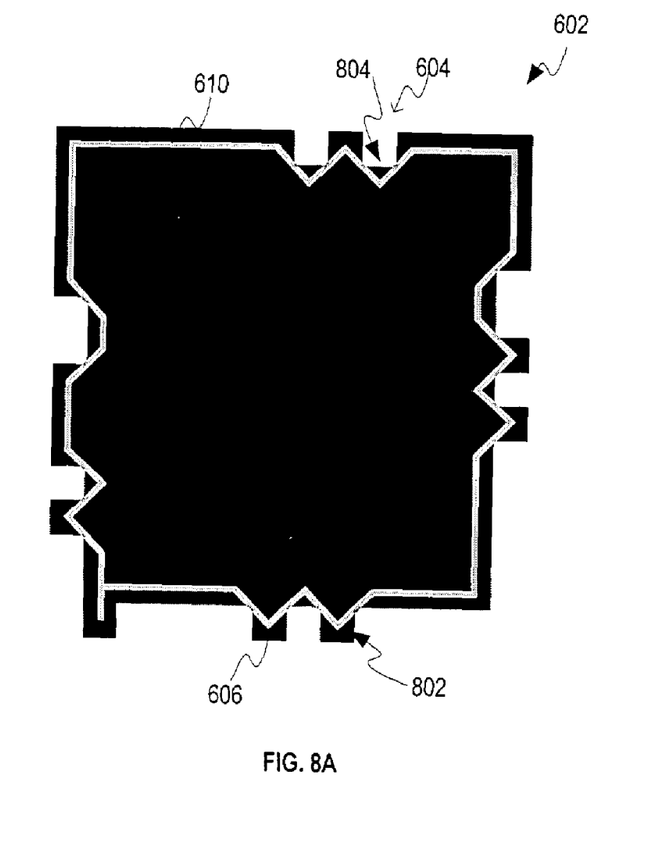
FIGS. 8A-B depict the application of the method illustrated in FIG. 7 according to the present invention.
Figure 8B:
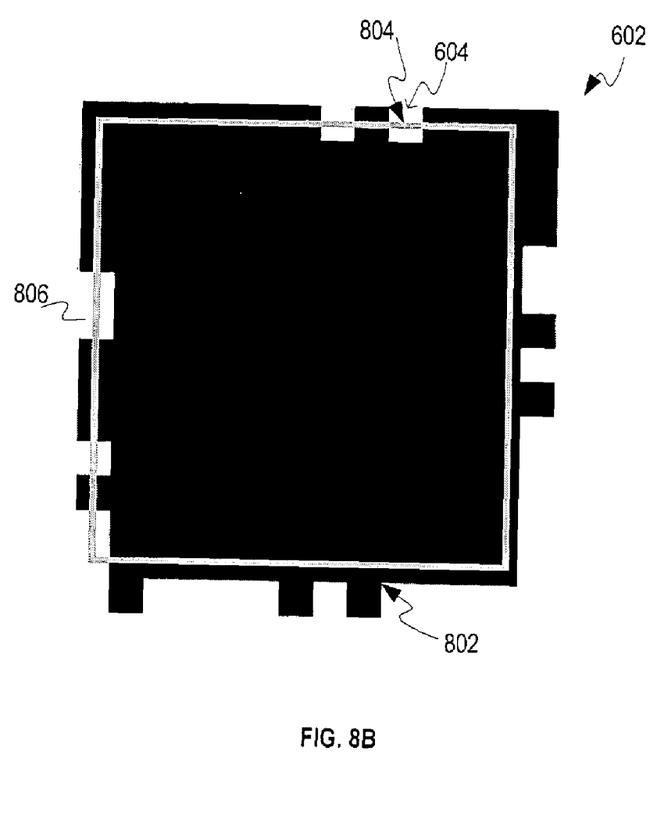

FIGS. 8A-B illustrate the application of step 406 to the object 602 from FIGS. 6A-C. FIG. 8A shows the resulting polygon 610 from step 404, with hole 604 and bump 606. Vertex 802 is located in a bump, and vertex 804 is located below a hole. FIG. 8B shows the smoothed polygon 806. The vertex 802 has been moved out of the bump, and vertex 804 has been moved into the hole.

To avoid side effects, the process of searching for a sequential set of horizontal or vertical vertices of step 702 is not stopped at the last vertex to be visited, but is pursued for a few extra earlier visited vertices, in case the last vertices and the first vertices form a near-line. This prevents individual holes or bumps not being smoothed when positioned exactly at the first vertex of the polygon.

The process 406 is repeated for vertical lines using an analogous method, for all objects of the image.

Figure 9A:
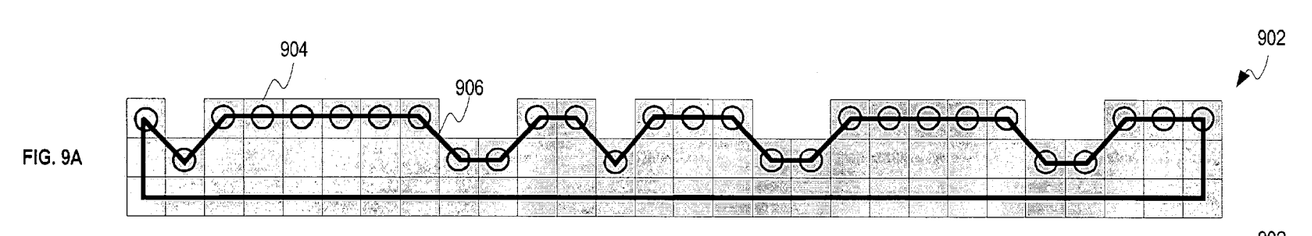
FIGS. 9A-C depict the application of the method illustrated in FIG. 7 according to the present invention.
Figure 9B:
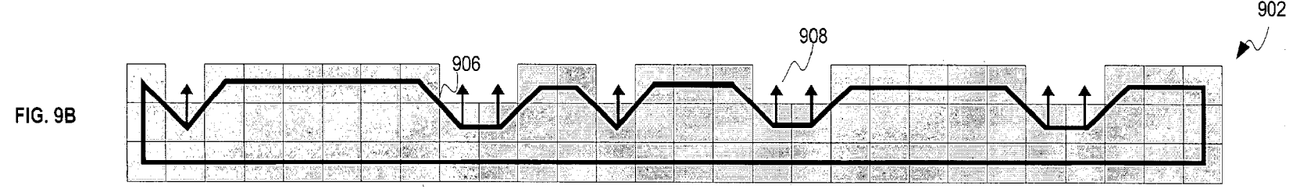
Figure 9C:
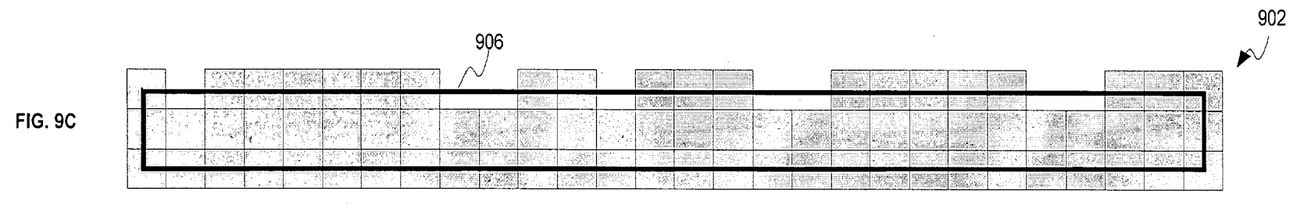

FIGS. 9A-C illustrate the application of step 406 to an object 902. FIG. 9A shows the object 902 with unsmoothed edge pixels indicated by circles, for example in pixel 904, and the object's polygon 906. FIG. 9B shows that there are twenty pixels at the higher vertical position and only eight at the lower vertical position. The polygon 906 will be smoothed to the higher position, as indicated for example, by arrow 908. FIG. 9C shows the result of the polygon smoothing.

Figure 10:
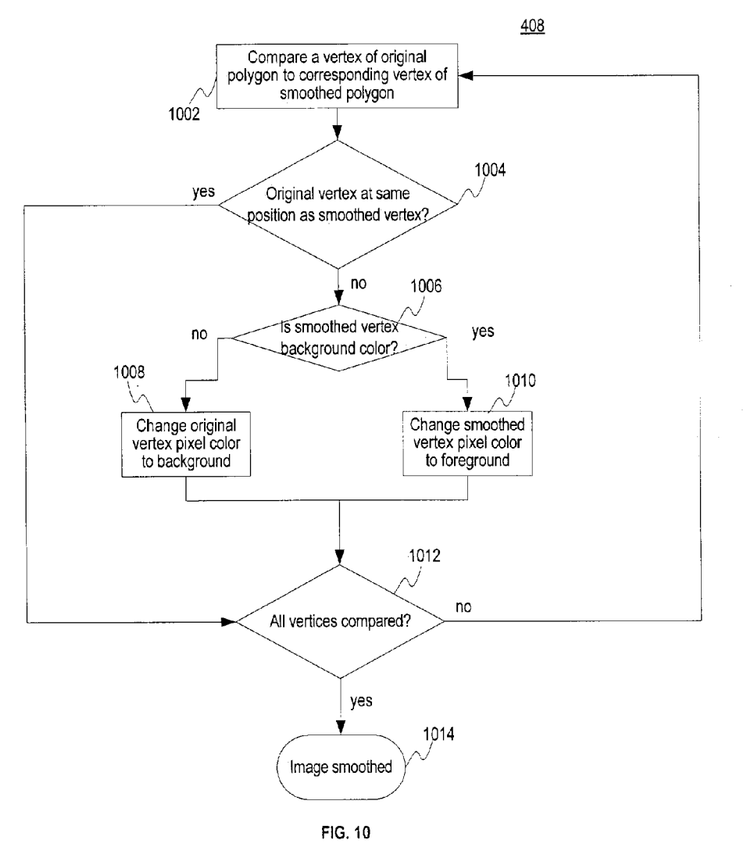
FIG. 10 depicts a flow chart of an exemplary embodiment of the step of smoothing images according to the present invention.

FIG. 10 depicts a flow chart of an exemplary embodiment of the image smoothing step 408 according to the present invention. For each object in an image, each vertex of the original polygon is compared with the corresponding vertex of the smoothed polygon in step 1002. If a vertex of the original polygon is not at the same location as the corresponding vertex of the smoothed polygon at step 1004, and if the pixel at the smoothed vertex is not the background color at step 1006, the pixel at the original vertex is changed to the background color at step 1008. Otherwise, if the pixel at the smoothed vertex is the background color, the pixel at the smoothed vertex is changed to the foreground color at step 1010. The process repeats at step 1012 until all of the vertices have been compared, resulting in a smoothed image 1014.

Figure 11A:
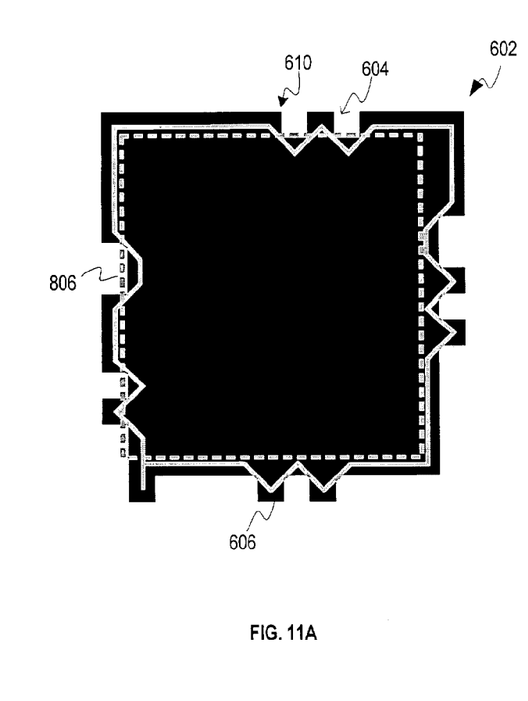
FIGS. 11A-C depict the application of the method illustrated by FIG. 10 according to the present invention.
Figure 11B:
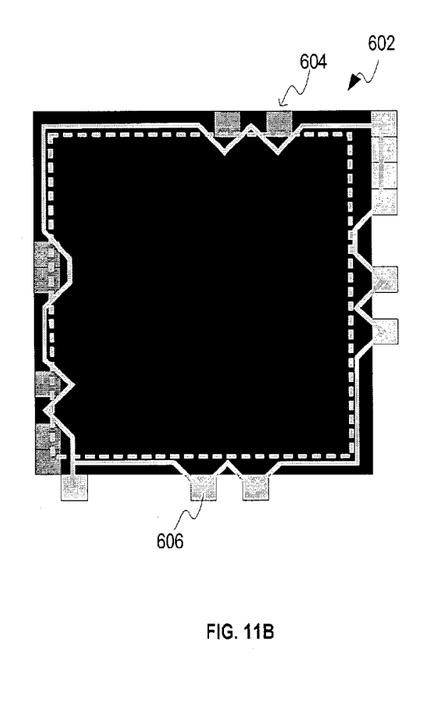
Figure 11C:
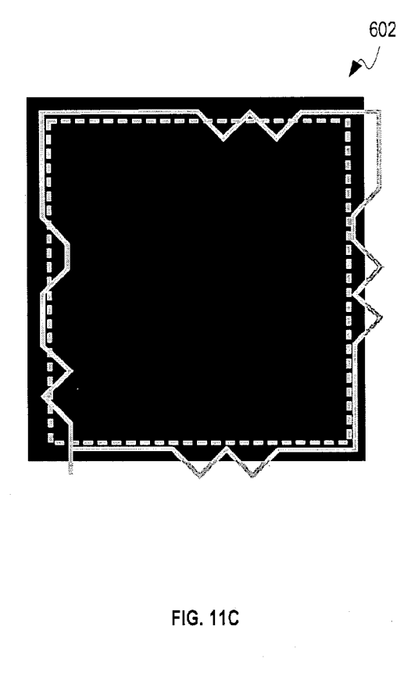

FIGS. 11A-C illustrate the application of step 408 to the object 602. FIG. 11A shows object 602 with hole 604 and bump 606. The original polygon 610 indicated by a solid line is compared to the smoothed polygon 806 indicated by a dashed line. FIG. 11B shows which pixels will have their colors changed. Bumps, such as bump 606, will be removed by changing their color from foreground to background. Holes, such as hole 604, will be filled by changing their color from background to foreground. FIG. 11C shows the smoothed image.

Figure 12A:
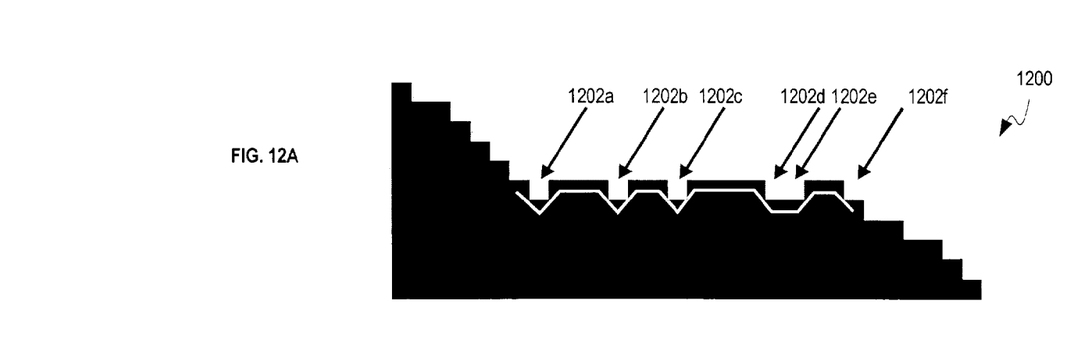
FIG. 12 depicts a special case of the application of the method illustrated by FIG. 7.
Figure 12B:
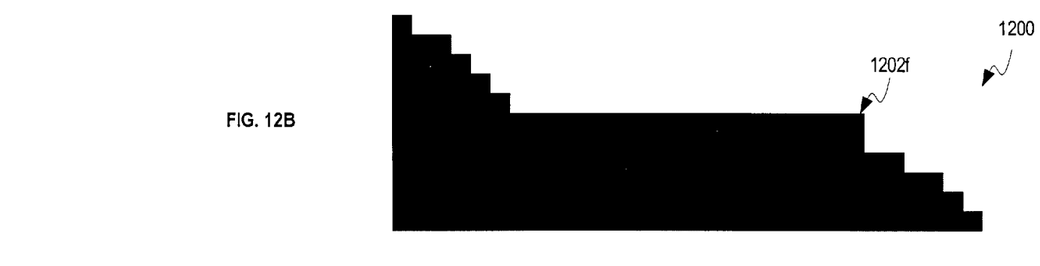
Figure 12C:
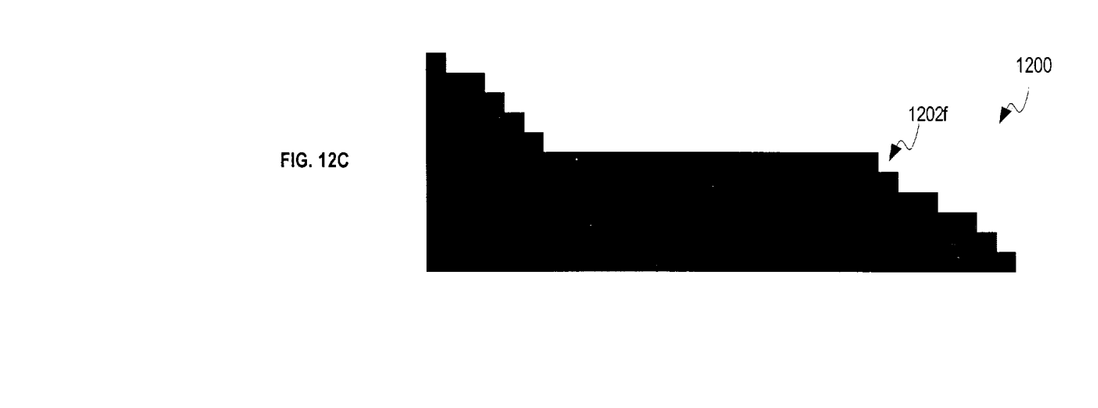

FIGS. 12A-C illustrate a special case (step 712) in the application of steps 406 and 408. In the special case, the first and last pixels of a near line should not be modified if changing the color of a pixel breaks the natural change in the curve of the polygon after or before that line.

FIG. 12A shows an object 1200, with a number of holes 1202a-f. Ordinarily, hole 1202f, the last pixel on that horizontal line, would be filled in order to make a smooth horizontal line. If that were done, however, that horizontal line would not link well with the rest of the polygon to the right of hole 1202f, as seen in FIG. 12B, where there is a large step from filled pixel at 1202f down to the right. In the special case, it is better not to make the change for the last pixel of the line, as it makes a smoother transition, as seen in FIG. 12C where there is a more gradual transition from the smoothed line down to the right.

Figure 13A:
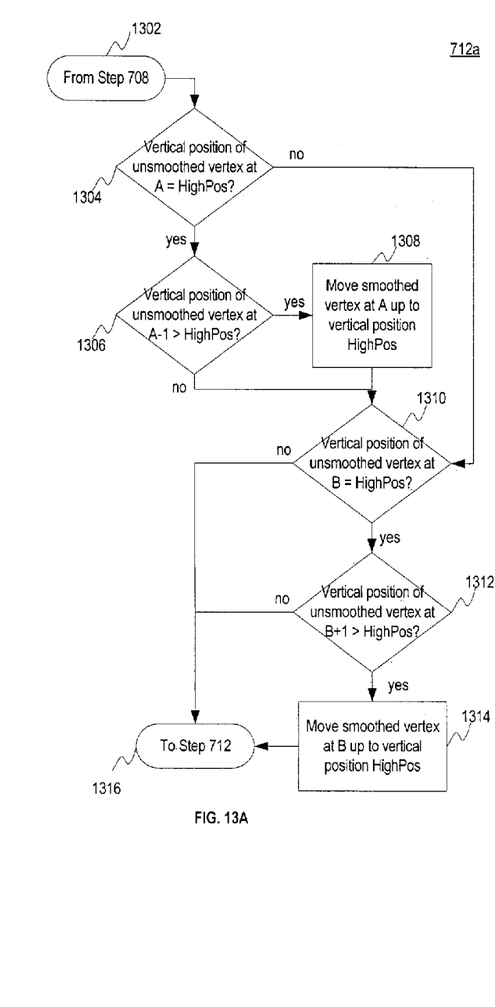
FIGS. 13A-B depicts a flow chart of the method of the special case.
Figure 13B:
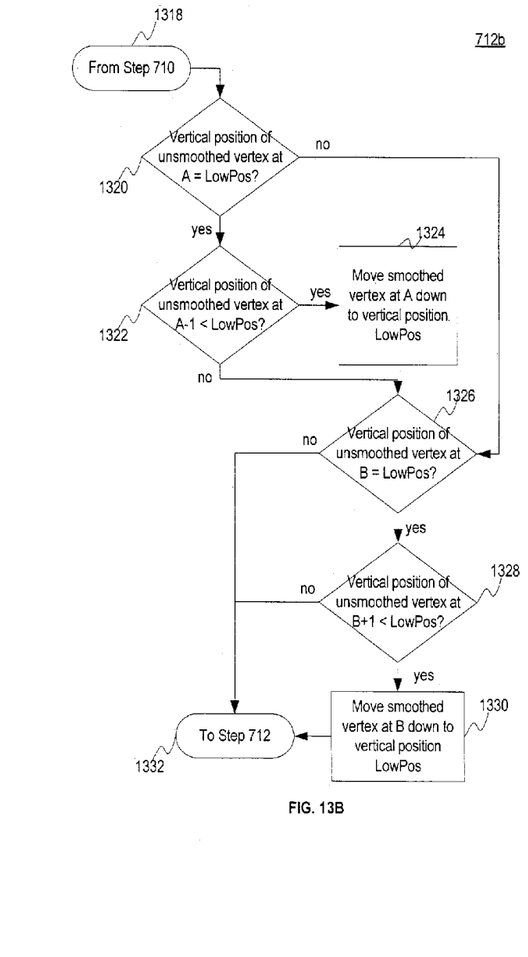

FIGS. 13A-B depict flow charts of an exemplary embodiment of the treatment of the special case illustrated in FIG. 12 according to the present invention. For the purposes of the following discussion, in the near horizontal line, the low vertical position is called "LowPos" and the high vertical position is called "HighPos". Index A in the polygon corresponds to the position of the vertex at the start of the near-horizontal line (for example, the vertex one pixel to the left of 1202a), and index B corresponds to the position of the vertex at the end of the near-horizontal line (for example, the vertex at 1202f). FIG. 13A starts after the application of step 708, where all pixels at the higher position (HighPos) have been moved down one pixel (to LowPos). If the unsmoothed vertical position of the vertex at index A is equal to "HighPos" at step 1304, and if the location of the vertex at index A−1 is higher than "HighPos" at step 1306, then the smoothed vertex at index A is raised to position "HighPos" at step 1308. Then, if the unsmoothed location of the vertex at index B is equal to "HighPos" at step 1310, and if the location of the vertex at index B+1 is higher than "HighPos" at step 1312, then smoothed vertex at index B is raised to position "HighPos" at step 1314. If there is no vertex at either index A−1 or B+1, indicating the end of the object in the horizontal direction, then the special case does not apply to that side.

FIG. 13B starts after the application of step 710, where all pixels at the lower position (LowPos) have been moved up one pixel (to HighPos). The process is analogous to the process described for FIG. 13A and is described here with reference to FIG. 12B. After the application of step 710 to FIG. 12A, resulting in FIG. 12B, the vertical position of the unsmoothed vertex at A is compared to the low position in step 1320. The vertex at index A is at the high position, so next the vertical position of unsmoothed vertex at index B (below hole 1202f) is compared to the low position, in step 1326. Because unsmoothed vertex at index B is at the low position, next the position of the vertex to the right of vertex at index B is compared to the low position in step 1328. The vertex to the right of the vertex at index B is lower than the unsmoothed vertex at index B, so the smoothed vertex at index B is lowered to the low position in step 1330, as seen in FIG. 12C.

The special case processing of FIGS. 12 and 13 is performed analogously for vertical lines, but is not illustrated.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method of edge-smoothing in raster images, the method comprising the steps of:
    (a) selecting an object in a raster image, said object including an edge having a plurality of edge pixels;
    (b) finding all of said edge pixels of said object and generating a polygon having a plurality of vertices, each of which is located at the center of a corresponding one of said edge pixels;
    (c) smoothing said polygon of said object to generate a smoothed polygon by comparing a first number of polygon vertices in a first position to a second number of polygon vertices in a second position, wherein said first and second numbers of vertices are in a substantially horizontal or vertical linear arrangement, and changing the positions of said vertices in the smaller of said first and second numbers of vertices to the positions of the larger of said first and second numbers of vertices; and
    (d) smoothing said object according to said smoothed polygon.

2. The method of claim 1, wherein said step (b) comprises the steps of:
    (1) locating all edge pixels in said object;
    (2) creating an empty polygon;
    (3) finding an unvisited edge pixel on said object;
    (4) marking said found pixel as visited;
    (5) adding a vertex to said polygon wherein said vertex is positioned at the center of said found pixel; and
    (6) repeating said steps (b)(3) through (b)(5) until all of said edge pixels in said object are visited, wherein said found pixel in step (b)(3) is adjacent to a found pixel from a previous iteration.

3. The method of claim 1, wherein said step (c) comprises the steps of:
    (1) locating a sequential set of vertices in said polygon that form a near horizontal line at least M pixels long;
    (2) determining if all of said vertices in said sequential set are at the same vertical position;
    (3) comparing a number of vertices H that are at a higher position to a number of vertices L that are at a lower position when not all of said vertices in said sequential set are at the same vertical position;
    (4) moving all vertices that are at said higher position down one pixel when said number L is greater than said number H;
    (5) moving all vertices that are at said lower position up one pixel when said number when L is not greater than said number H;
    (6) repeating said steps (c)(1) through (c)(5) for all sets of sequential vertices in said polygon that form a near horizontal line at least M pixels long.

4. The method of claim 3, wherein said step (c) further comprises the steps of:
    (7) locating a sequential set of vertices in said polygon that form a near vertical line at least M pixels long;
    (8) determining if all of said vertices in said sequential set are at the same horizontal position;
    (9) comparing a number of vertices R that are in a rightmost position to a number of vertices L2 that are in a leftmost position when not all of said vertices in said sequential set are at the same horizontal position;
    (10) moving all vertices that are at said rightmost position to the left one pixel when said number L2 is greater than said number R;
    (11) moving all vertices that are at said leftmost position to the right one pixel when said number L2 is not greater than said number R; and
    (12) repeating said steps (c)(7) through (c)(11) for all sets of sequential vertices in said polygon that form a near vertical line at least M pixels long.

5. The method of claim 1, wherein said step (d) further comprises the steps of:
    (1) comparing the position of an original vertex of said polygon with the position of a corresponding smoothed vertex of said smoothed polygon;
    (2) determining a color of a pixel at said position of said smoothed vertex when said position of said smoothed vertex is different from said position of said original vertex;
    (3) changing a color of a pixel at the position of said smoothed vertex to a foreground color when said pixel is a background color;
    (4) changing a color of a pixel at the position of said original vertex to a background color when said pixel is a foreground color; and
    (5) repeating steps (d)(1) through (d)(4) until all vertices have been compared.

6. The method of claim 3, wherein step (c)(4) further comprises:
    (i) determining if a rightmost unsmoothed vertex in said near horizontal line is at said higher position;
    (ii) determining if an unsmoothed vertex located next to the right of said rightmost vertex is at a position higher than said higher position, when an unsmoothed vertex exists next to the right of said rightmost vertex;
    (iii) moving a smoothed vertex corresponding to said rightmost unsmoothed vertex up to said higher position when both (i) and (ii) are true;
    (iv) determining if a leftmost unsmoothed vertex in said near horizontal line is at said higher position;
    (v) determining if an unsmoothed vertex located next to the left of said leftmost vertex is at a position higher than said higher position, when an unsmoothed vertex exists next to the left of said leftmost vertex; and
    (vi) moving a smoothed vertex corresponding to said leftmost unsmoothed vertex up to said higher position when both (iv) and (v) are true.

7. The method of claim 3, wherein step (c)(5) further comprises
    (i) determining if a rightmost unsmoothed vertex in said near horizontal line is at said lower position;
    (ii) determining if an unsmoothed vertex located next to the right of said rightmost vertex is at a position lower than said lower position, when an unsmoothed vertex exists next to the right of said rightmost vertex;
    (iii) moving a smoothed vertex corresponding to said rightmost unsmoothed vertex down to said lower position when both (i) and (ii) are true;
    (iv) determining if a leftmost unsmoothed vertex in said near horizontal line is at said lower position;

(v) determining if an unsmoothed vertex located next to the left of said leftmost vertex is at a position lower than said lower position, when an unsmoothed vertex exists next to the left of said leftmost vertex; and (vi) moving a smoothed vertex corresponding to said leftmost unsmoothed vertex down to said lower position when both (iv) and (v) are true.

8. The method of claim 4, wherein step (c)(10) further comprises:

(i) determining if a topmost unsmoothed vertex in said near vertical line is at said rightmost position;

(ii) determining if an unsmoothed vertex located just above said topmost vertex is at a position more to the right than said rightmost position, when an unsmoothed vertex exists just above said topmost vertex;

(iii) moving a smoothed vertex corresponding to said topmost unsmoothed vertex over to said rightmost position when both (i) and (ii) are true;

(iv) determining if a bottommost unsmoothed vertex in said near vertical line is at said rightmost position;

(v) determining if an unsmoothed vertex located just below said bottommost vertex is at a position more to the right than said rightmost position, when an unsmoothed vertex exists just below said bottommost vertex; and (vi) moving a smoothed vertex corresponding to said bottommost unsmoothed vertex over to said rightmost position when both (iv) and (v) are true.

9. The method of claim 4, wherein step (c)(11) further comprises:

(i) determining if a topmost unsmoothed vertex in said near vertical line is at said leftmost position;

(ii) determining if an unsmoothed vertex located just above said topmost vertex is at a position more to the left than said leftmost position, when an unsmoothed vertex exists just above said topmost vertex;

(iii) moving a smoothed vertex corresponding to said topmost unsmoothed vertex over to said leftmost position when both (i) and (ii) are true;

(iv) determining if a bottommost unsmoothed vertex in said near vertical line is at said leftmost position;

(v) determining if an unsmoothed vertex located just below said bottommost vertex is at a position more to the left than said leftmost position, when an unsmoothed vertex exists just below said bottommost vertex; and (vi) moving a smoothed vertex corresponding to said bottommost unsmoothed vertex over to said leftmost position when both (iv) and (v) are true.

10. The method of claim 1, wherein said step (c) comprises smoothing at least two adjacent vertices in said polygon.

11. A system for edge-smoothing in raster images comprising:

(a) means for selecting an object in a raster image, said object including an edge having a plurality of edge pixels;

(b) means for finding all of said edge pixels of said object and generating a polygon having a plurality of vertices, each of which is located at the center of a corresponding one of said edge pixels;

(c) means for smoothing said polygon of said object to generate a smoothed polygon by comparing a first number of polygon vertices in a first position to a second number of polygon vertices in a second position, wherein said first and second numbers of vertices are in a substantially horizontal or vertical linear arrangement, and changing the positions of said vertices in the smaller of said first and second numbers of vertices to the positions of the larger of said first and second numbers of vertices; and (d) means for smoothing said object according to said smoothed polygon.

12. The system of claim 11, wherein said element (b) further comprises:

(1) means for locating all edge pixels in said object;

(2) means for creating an empty polygon;

(3) means for finding an unvisited edge pixel on said object;

(4) means for marking said found pixel as visited; and (5) means for adding a vertex to said polygon wherein said vertex is positioned at the center of said found pixel.

13. The system of claim 11, wherein said element (c) further comprises:

(1) means for locating a sequential set of vertices in said polygon that form a near horizontal line at least M pixels long;

(2) means for determining if all of said vertices in said sequential set are at the same vertical position;

(3) means for comparing a number of vertices H that are at a higher position to a number of vertices L that are at a lower position when not all of said vertices in said sequential set are at the same vertical position;

(4) means for moving all vertices that are at said higher position down one pixel when said number L is greater than said number H; and (5) means for moving all vertices that are at said lower position up one pixel when said number when L is not greater than said number H.

14. The system of claim 11, wherein said element (d) further comprises:

(1) means for comparing the position of an original vertex of said polygon with the position of a corresponding smoothed vertex of said smoothed polygon;

(2) means for determining a color of a pixel at said position of said smoothed vertex when said position of said smoothed vertex is different from said position of said original vertex;

(3) means for changing a color of a pixel at the position of said smoothed vertex to a foreground color when said pixel is a background color; and (4) means for changing a color of a pixel at the position of said original vertex to a background color when said pixel is a foreground color.

15. A computer useable information storage medium storing computer readable program code for causing a computer to perform the steps of:

(a) selecting an object in a raster image, said object including an edge having a plurality of edge pixels;

(b) finding all of said edge pixels of said object and generating a polygon having a plurality of vertices, each of which is located at the center of a corresponding one of said edge pixels;

(c) smoothing said polygon of said object to generate a smoothed polygon by comparing a first number of polygon vertices in a first position to a second number of polygon vertices in a second position, wherein said first and second numbers of vertices are in a near horizontal or near vertical linear arrangement, and changing the positions of said vertices in the smaller of said first and second numbers of vertices to the positions of the larger of said first and second numbers of vertices; and (d) smoothing said object according to said smoothed polygon.

16. The computer useable information storage medium storing computer readable program code of claim 15, wherein said step (b) comprises the steps of:
   (1) locating all edge pixels in said object;
   (2) creating an empty polygon;
   (3) finding an unvisited edge pixel on said object;
   (4) marking said found pixel as visited;
   (5) adding a vertex to said polygon wherein said vertex is positioned at the center of said found pixel; and
   (6) repeating said steps (b)(3) through (b)(5) until all of said edge pixels in said object are visited, wherein said found pixel in step (b)(3) is adjacent to a found pixel from a previous iteration.

17. The computer useable information storage medium storing computer readable program code of claim 15, wherein said step (c) comprises the steps of:
   (1) locating a sequential set of vertices in said polygon that form a near horizontal line at least M pixels long;
   (2) determining if all of said vertices in said sequential set are at the same vertical position;
   (3) comparing a number of vertices H that are at a higher position to a number of vertices L that are at a lower position when not all of said vertices in said sequential set are at the same vertical position;
   (4) moving all vertices that are at said higher position down one pixel when said number L is greater than said number H;
   (5) moving all vertices that are at said lower position up one pixel when said number when L is not greater than said number H;
   (6) repeating said steps (c)(1) through (c)(5) for all sets of sequential vertices in said polygon that form a near horizontal line at least M pixels long.

18. The computer useable information storage medium storing computer readable program code of claim 17, wherein said step (c) further comprises the steps of:
   (7) locating a sequential set of vertices in said polygon that form a near vertical line at least M pixels long;
   (8) determining if all of said vertices in said sequential set are at the same horizontal position;
   (9) comparing a number of vertices R that are in a rightmost position to a number of vertices L2 that are in a leftmost position when not all of said vertices in said sequential set are at the same horizontal position;
   (10) moving all vertices that are at said rightmost position to the left one pixel when said number L2 is greater than said number R;
   (11) moving all vertices that are at said leftmost position to the right one pixel when said number L2 is not greater than said number R; and
   (12) repeating said steps (c)(7) through (c)(11) for all sets of sequential vertices in said polygon that form a near vertical line at least M pixels long.

19. The computer useable information storage medium storing computer readable program code of claim 15, wherein said step (d) further comprises the steps of:
   (1) comparing the position of an original vertex of said polygon with the position of a corresponding smoothed vertex of said smoothed polygon;
   (2) determining a color of a pixel at said position of said smoothed vertex when said position of said smoothed vertex is different from said position of said original vertex;
   (3) changing a color of a pixel at the position of said smoothed vertex to a foreground color when said pixel is a background color;
   (4) changing a color of a pixel at the position of said original vertex to a background color when said pixel is a foreground color; and
   (5) repeating steps (d)(1) through (d)(4) until all vertices have been compared.

20. The computer useable information storage medium storing computer readable program code of claim 17, wherein said step (c)(4) further comprises:
   (i) determining if a rightmost unsmoothed vertex in said near horizontal line is at said higher position;
   (ii) determining if an unsmoothed vertex located next to the right of said rightmost vertex is at a position higher than said higher position, when an unsmoothed vertex exists next to the right of said rightmost vertex;
   (iii) moving a smoothed vertex corresponding to said rightmost unsmoothed vertex up to said higher position when both (i) and (ii) are true;
   (iv) determining if a leftmost unsmoothed vertex in said near horizontal line is at said higher position;
   (v) determining if an unsmoothed vertex located next to the left of said leftmost vertex is at a position higher than said higher position, when an unsmoothed vertex exists next to the left of said leftmost vertex; and
   (vi) moving a smoothed vertex corresponding to said leftmost unsmoothed vertex up to said higher position when both (iv) and (v) are true.

21. The computer useable information storage medium storing computer readable program code of claim 17, wherein said step (c)(5) further comprises
   (i) determining if a rightmost unsmoothed vertex in said near horizontal line is at said lower position;
   (ii) determining if an unsmoothed vertex located next to the right of said rightmost vertex is at a position lower than said lower position, when an unsmoothed vertex exists next to the right of said rightmost vertex;
   (iii) moving a smoothed vertex corresponding to said rightmost unsmoothed vertex down to said lower position when both (i) and (ii) are true;
   (iv) determining if a leftmost unsmoothed vertex in said near horizontal line is at said lower position;
   (v) determining if an unsmoothed vertex located next to the left of said leftmost vertex is at a position lower than said lower position, when an unsmoothed vertex exists next to the left of said leftmost vertex; and
   (vi) moving a smoothed vertex corresponding to said leftmost unsmoothed vertex down to said lower position when both (iv) and (v) are true.

22. The computer useable information storage medium storing computer readable program code of claim 18, wherein said step (c)(10) further comprises:
   (i) determining if a topmost unsmoothed vertex in said near vertical line is at said rightmost position;
   (ii) determining if an unsmoothed vertex located just above said topmost vertex is at a position more to the right than said rightmost position, when an unsmoothed vertex exists just above said topmost vertex;
   (iii) moving a smoothed vertex corresponding to said topmost unsmoothed vertex over to said rightmost position when both (i) and (ii) are true;
   (iv) determining if a bottommost unsmoothed vertex in said near vertical line is at said rightmost position;
   (v) determining if an unsmoothed vertex located just below said bottommost vertex is at a position more to the right than said rightmost position, when an unsmoothed vertex exists just below said bottommost vertex; and (vi) moving a smoothed vertex corresponding to said bottommost unsmoothed vertex over to said rightmost position when both (iv) and (v) are true.

23. The computer useable information storage medium storing computer readable program code of claim 18, wherein said step (c)(11) further comprises:

(i) determining if a topmost unsmoothed vertex in said near vertical line is at said leftmost position;

(ii) determining if an unsmoothed vertex located just above said topmost vertex is at a position more to the left than said leftmost position, when an unsmoothed vertex exists just above said topmost vertex;

(iii) moving a smoothed vertex corresponding to said topmost unsmoothed vertex over to said leftmost position when both (i) and (ii) are true;

(iv) determining if a bottommost unsmoothed vertex in said near vertical line is at said leftmost position;

(v) determining if an unsmoothed vertex located just below said bottommost vertex is at a position more to the left than said leftmost position, when an unsmoothed vertex exists just below said bottommost vertex; and (vi) moving a smoothed vertex corresponding to said bottommost unsmoothed vertex over to said leftmost position when both (iv) and (v) are true.

* * * * *